(12) United States Patent
Barraqué

(10) Patent No.: US 8,070,961 B2
(45) Date of Patent: Dec. 6, 2011

(54) SO-CALLED WATER CATALYTIC DECARBONATION APPLIANCES

(75) Inventor: Christian Barraqué, Sannois (FR)

(73) Assignee: Degremont, Rueilmalmaison (FR)

(*) Notice: Subject to any disclaimer, the term of this patent is extended or adjusted under 35 U.S.C. 154(b) by 1019 days.

(21) Appl. No.: 11/660,265

(22) PCT Filed: Aug. 8, 2005

(86) PCT No.: PCT/FR2005/002051
§ 371 (c)(1),
(2), (4) Date: Dec. 20, 2007

(87) PCT Pub. No.: WO2006/021672
PCT Pub. Date: Mar. 2, 2006

(65) Prior Publication Data
US 2008/0093304 A1    Apr. 24, 2008

(30) Foreign Application Priority Data

Aug. 19, 2004  (FR) ...................................... 04 08984
Oct. 15, 2004  (FR) ...................................... 04 10949

(51) Int. Cl.
*C02F 5/06*   (2006.01)

(52) U.S. Cl. ..... 210/715; 210/807; 210/205; 210/221.1; 210/287

(58) Field of Classification Search ................... 210/205
See application file for complete search history.

(56) References Cited

U.S. PATENT DOCUMENTS 4,389,317 A     6/1983   Trentelman et al.
5,454,959 A  * 10/1995   Stevens ........................ 210/792

FOREIGN PATENT DOCUMENTS

| EP | 0 434 484 B1 | 6/1991 |
| FR | 2 426 024 A | 12/1979 |
| FR | 2 656 295 A | 6/1991 |

* cited by examiner

Primary Examiner — Peter A Hruskoci
(74) Attorney, Agent, or Firm — Sughrue Mion, PLLC

(57) ABSTRACT

The invention aims at enabling, in a catalytic decarbonation apparatus, inert particles coated with calcium carbonate to be constantly and systematically extracted from the reactor, with no risk of clogging the discharge pipes. Therefor, said pipes (7'a, 7'b) have an inside diameter ranging between 40 and 60 mm and they have a downward incline up to their connection to an outside discharge conduit (8'), except, possibly, a horizontal portion starting from the orifice through which they emerge into the reactor (1').

8 Claims, 2 Drawing Sheets

SO-CALLED WATER CATALYTIC DECARBONATION APPLIANCES

The present invention relates to the decarbonation of water. A subject matter of the present invention is more particularly improvements made to "catalytic decarbonation" devices and their use.

Fundamental Decarbonation Reactions

It is known that natural water comprises a large number of dissolved mineral substances in highly variable proportions. Some are usually present in every type of water in appreciable concentrations, others exist only in the form of traces. The present invention relates only to the first.

These dissolved substances comprise:
anions: carbonates and bicarbonates, sulfates, chlorides and nitrates, silica;
and cations: calcium, magnesium and alkali metals (mainly sodium).

In order to conform to the standard usage, the ions will be mentioned below in the form of their salts but, in practice, it should not be forgotten that, at the usual concentrations of natural water, the dissolved salts are completely dissociated into $HCO_3^-$ or $CO_3^{2-}$, $SO_4^{2-}$ or $Cl^-$ anions and into $Ca^{2+}$, $Mg^{2+}$, $Na^+$, and the like, cations and that it is therefore highly simplifying to arbitrarily group them together, for example by systematically combining sodium with chloride or calcium with bicarbonate. In fact, the cations only join together with the anions when they precipitate in the insoluble form, in accordance with Berthollet's laws.

At the beginning of the reactions for the purification of water, they are completely free and it is only in order to conform with the conventional practices that the conventional writing of these reactions in the form of molecules and not in the form of ions has been adopted.

These reactions, well known in the art, will be restated below.

Action of Lime on Calcium Bicarbonate

1) Case of Water Comprising Solely Calcium Salts

In this case, it is the fundamental decarbonation reaction which applies, based on the large difference in solubility between calcium bicarbonate and neutral carbonate:

(1)

The solubility of $CaCO_3$ and its equilibrium with free $CO_2$ or "semicombined" $CO_2$ have formed the subject of innumerable studies. The various investigations cited in the Degrémont Water Technical Handbook, published by Cinquantenaire, 1988, define the equilibrium conditions of a water with the $CaCO_3$ precipitate. The investigations by Pourbaix teach the solubility of calcium carbonate as a function of numerous factors and make it possible to predict the theoretical amount of calcium carbonate remaining in solution if the dose of lime used is exactly stoichiometric. This amount usually corresponds to values of between 0.2 and 0.3 milliequivalent TA/liter (TA: bicarbonate content; see below) but this figure is very rarely achieved in practice.

The calcium corresponding to the strong anions, sulfates, chlorides and nitrates, commonly denoted under the name of permanent hardness of the water, naturally remains in solution, the lime not being capable of reacting with these various salts at the usual concentrations of raw water.

If the alkalinity remaining in solution in the treated water is considered, three cases can be envisaged in the case of a raw water purely calcareous:
1. There is an insufficient amount of lime: a portion of the calcium bicarbonate remains in solution, so that $Ca(HCO_3)_2$ and $CaCO_3$, at the solubility limit of the latter, are simultaneously present in the water.
2. The dosage is correct: there remains only the fraction of $CaCO_3$ soluble in the water.
3. There is an excess of lime: free lime in excess coexists with the calcium carbonate at its solubility limit.

It should be remembered that the titration of the alkalinity of a water comprises two measurements:
the permanent alkalinity (P-alkalinity), or PA, obtained by assaying by means of a titrated solution of dilute acid, the indicator of change in color being phenolphthalein at pH=8.2/8.3;
the total alkalinity (M-alkalinity), or TA, defined by assaying by means of the same solution but by change in color of the methyl orange indicator, at pH=3.5/4.5.

Case of a Water Comprising Both Calcium and Magnesium:

This situation is that which is generally encountered, water purely calcareous being exceptional.

In this case, the water is then characterized by the contents (concentrations) defined below:
TH (total hardness)=C.Ca+C.Mg (calcium content+magnesium content),
TA=bicarbonate content (temporary hardness of the water).

The difference TH−TA represents the total hardness due to the salts of strong anions ($SO_4^{2-}+Cl^-+NO_3^{2-}$) (permanent hardness of the water).

In this case, the lime brings about the formation of $CaCO_3$ until complete purification from the calcium fraction of the TA has been achieved, this being reduced to the solubility of the $CaCO_3$ under cold conditions.

The water then comprises all the C.Mg and a C.Ca equal to the initial C.Ca reduced by the milliequivalents of TA precipitated in the carbonate state.

If excess lime is added, the following secondary reaction is brought about:

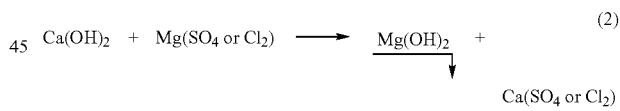
(2)

Insoluble magnesia precipitates and calcium passes into solution, purely and simply replacing the magnesium.

Except in the exceptional case of water with a very high selenium content, this calcium remains soluble, the solubility of calcium sulfate in cold water being of the order of 2 grams per liter, a value much higher than that which results from the above reaction (2).

In practice, this addition does not modify the overall TH of the purified water; the PA and the TA are slightly increased due to the solubility in water of the magnesia (of the order of 0.1 milliequivalent/liter) and remain virtually constant, as long as the magnesia is not completely precipitated. At optimal purification, a small amount of free magnesia will be present in the water, so that PA is very slightly greater than TA/2.

Action of Soda on Calcium Bicarbonate

This method is a variant of the process described above for treatment with lime, either when it is desired both to decarbonate and to soften the water treated or when the use of caustic soda appears, logically or economically, more advantageous than that of lime.

1. In a first step, the reaction (3) below takes place:

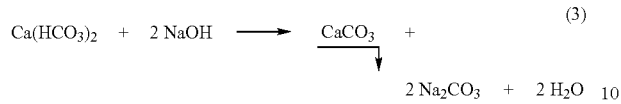

$$Ca(HCO_3)_2 + 2\,NaOH \longrightarrow CaCO_3\downarrow + 2\,Na_2CO_3 + 2\,H_2O \qquad (3)$$

2. If, after this precipitation, there still exists sufficient calcium ions associated with sulfates or with chlorides, the following reaction takes place:

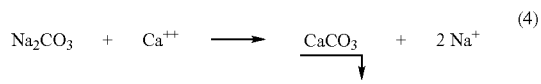

$$Na_2CO_3 + Ca^{++} \longrightarrow CaCO_3\downarrow + 2\,Na^+ \qquad (4)$$

Such a reaction is, for example, the following:

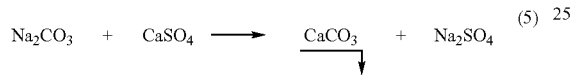

$$Na_2CO_3 + CaSO_4 \longrightarrow CaCO_3\downarrow + Na_2SO_4 \qquad (5)$$

The soda then acts as if 2 NaOH replaced 1 Ca(OH)$_2$ and 1 Na$_2$CO$_3$, this, however, being the case only if the raw water comprises enough calcium bonded to sulfates or chlorides (permanent hardness) for the calcium to be swapped with the sodium of the Na$_2$CO$_3$.

The TA can be reduced to less than 0.6 milliequivalent/liter only if all the Na$_2$CO$_3$ produced by the reaction (3) is combined with enough calcium to precipitate it in the form of CaCO$_3$, that is to say if the calcium content of the raw water, C.Ca, is equal to or greater than 2 TA.

If the C.Ca is less than 2 TA and if the NaOH dose was calculated according to this TA, an excess of free Na$_2$CO$_3$ will remain in the water, which will give the water a PA and a TA which will become greater as the value of (2 TA−C.Ca) for the raw water increases.

However, the method remains advantageous, if the retention in the water of a certain level of bicarbonates is accepted (for example, in the treatment of a drinking water), but it is then necessary to reduce the dose of soda to the stoichiometric equivalent of C.Ca/2.

In conclusion, the use of caustic soda makes it possible to lower the total hardness of a water, without any risk and with a purification as complete as with lime; this lowering in TH will be equal to twice the reduction in the level of bicarbonates, provided that the dose of soda introduced does not exceed half the calcium content of the raw water.

The PA and the TA are then as low as if the equivalent dose of lime had been used.

However, it should be noted that a correction has to be made to the calculation of the dose of soda if the raw water comprises free carbonic acid, which results in an additional consumption of soda due to the reaction:

$$2NaOH + CO_2 \rightarrow Na_2CO_3 + H_2O \qquad (6)$$

Equipment Employed

The equipment available in the art is characterized by the rate of the water treatment, which rate is expressed in the following way: a rate of 1 meter per hour corresponds to the treatment of one cubic meter of water per square meter of surface area of the reactor and per hour, that is to say 1 m$^3$/m$^2$/h.

Three categories of equipment have been or are used in the field of decarbonation by precipitation:

"Slow" reactors (for example, conventional clarifiers modified to give decarbonaters and comprising only one mixing chamber followed by a space for settling); these reactors are characterized by a very low rate of flow (and thus a large spatial requirement), the residence time being set by the extremely slow kinetics for precipitation of the calcium carbonate (the precipitation equilibrium at ambient temperature is reached only at the end of 20 to 30 hours after mixing the lime or the soda with the water to be treated). By way of indication, the treatment rate possible with such a reactor is of the order of a few centimeters per hour, to avoid any risk of extensive scaling of the downstream filters.

Sludge recirculation reactors, into which a fraction of the calcium carbonate sludges produced during the decarbonation reaction is reinjected upstream of the reactor, which makes it possible to bring about a "seeding" of the water to be treated, which practice greatly accelerates the reaction kinetics; this is because it is possible to consider, in this case, that the decarbonation reaction reaches its equilibrium in a few minutes of contact time with the sludges (2 to 3 minutes is generally sufficient). These reactors comprise two very distinct regions: one, with a restricted volume and with very turbulent conditions, makes it possible to provide the water to be treated+reactant (lime or soda) contact and the other provides the water/sludges separation and thus the clarification of the water. In this case, a significant improvement in the treatment rate, a few meters to a few tens of meters per hour, according to whether the equipment does or does not comprise a lamellar separation system, is achieved.

Finally, and this constitutes a specific case of the preceding reactors, "catalytic" decarbonaters, in which use is made of a body of sand or of another inert mineral material in the form of particles used to seed the reactor, the sand grains becoming gradually coated with calcium carbonate and subsequently acting as seeds, make it possible to accelerate (or to "catalyze") the decarbonation reaction. These decanters are very compact, in comparison with the devices described above, since they in fact comprise only the reaction region described in the case of the sludge recirculation reactors; the treatment rate in this equipment can reach 70 meters per hour, indeed even 100 meters per hour in the most favorable cases. The property of achieving such rates limits the application of this type of reactor to the case of "heavy sludges", to which sand coated with calcium carbonate perfectly applies, but completely excludes the clarification of water comprising "light" precipitates, such as magnesium hydroxide or organic flocs.

Decarbonation Equipment of the "Catalytic" Type

The essential difference from the sludge recirculation devices mentioned above lies in the systematic use of large seeds. Whereas, in the sludge beds of the preceding devices, the size of the individual crystals is of the order of 1/100 of a mm, the grains of a catalytic decarbonater (also known as pellet reactor) normally lie between 0.2 and 1 mm and can sometimes reach several millimeters.

The result of this is that they readily gather together in a concentrated mass and that the upward percolation of the raw water in a conical device makes it possible to obtain complete

reactions and correct separation of the precipitate with a device extremely reduced in size and a very high ascending rate.

The reactant and the water are introduced simultaneously into the reactor at a high rate, so as to bring about the movement of the grains situated at the base of the device and to prevent them from setting solid.

However, these grains have a tendency to grow indefinitely owing to the fact that it is always the same grains which first receive the raw water and the reactant and it is therefore necessary to systematically purge them and to periodically reintroduce fine grains.

This system exhibits two specific advantages, which are its low floor area and consequently the possibility of using the device under pressure. It thus makes it possible to treat, in decarbonation, a pressurized water and to return it to the circuit through closed filters.

Furthermore, the very fine carbonate sludges (grains of 10 to 30 microns) which are removed from the sludge recirculation systems are replaced here by beads of the order of 1 to 2 mm in diameter which are very rapidly drained and which can be transported without additional treatment to an authorized landfill site or alternatively can be reused as ballast, base course for stabilization of roads, drainage materials, and the like.

On the other hand, this technique exhibits certain disadvantages, the most important of which are as follows:
1. It is necessary to carefully monitor the change in the size of the sand grains sheathed with calcium carbonate as, if the latter grow excessively, the total reaction surface area becomes inadequate and the reaction becomes incomplete.
2. The device operates with water rich in organic colloids and with water having a magnesium content greater than TH–TA. Specifically, in the latter case, magnesia is precipitated, which magnesia does not syncrystallize with the $CaCO_3$ and hinders the rapid settling, without which the system is not viable.
3. The devices can only operate within fairly narrow flow rate limits (normally varying by 100%) as, if the flow rate slows down, the body of material ceases to fluidize and the formation of preferential passageways is observed, reflected by the emission of water of poor quality, indeed even by the crystals setting solid.

It is quite obviously easy to overcome the disadvantages mentioned under the above headings 2 and 3 since these are problems which concern a good knowledge of the characteristics of the water to be treated and of the water requirements of the operator. All these aspects can and should be defined during the preparation of the plan for the plant.

On the other hand, the problem posed by the control of the growth of the precipitation seeds requires regular monitoring of the body of catalyst and an efficient design of the systems for removing "large beads" of sand sheathed with calcium carbonate, as well as a minimum of inspection operations and of maintenance.

The invention relates specifically to the latter problem and much dynamic research and various trials on an industrial plant have been carried out by the Applicant Company in order to optimize the dimensioning and to specify the use of these decarbonation systems of the "catalytic" type.

SUMMARY OF THE INVENTION

The object of the invention is to make possible, in catalytic decarbonation equipment, regular and systematic removal of the sand particles coated with calcium carbonate having a size of greater than 1.2 mm in hydraulic diameter.

In the known art, this removal is carried out via flexible pipes emerging flush with the upper surface of the floor of the reactor, and at equal distance from one another, and connected to an external discharge pipeline, the path towards the outside of the device going under the floor comprising nozzles for feeding the reactor with raw water, with the wall of the device being passed through. This configuration has proved to be inappropriate for ensuring regular and efficient discharge of the "large beads" while entraining only a minimum of smaller beads.

This is because the flexible pipes used to remove these large coated beads do not occupy a fixed position defined with respect to the floor of the reactor, so that, although they have a general orientation sloping in the direction of the external discharge pipeline situated below the floor, they can locally comprise certain parts bent upwards, it being possible for discharged beads to be deposited and to accumulate in the lower part of which, with the consequence of at least partial local blocking of the pipe concerned.

FR 2 426 042 A has already disclosed a reactor for the removal of phosphate from water, into which is introduced, into the water, at least one reactant capable of forming a crystalline salt of very low solubility and of bringing the resulting mixture into contact with a seed which activates the crystallization. The contacting operation takes place in a fluidized bed of grains of the substance constituting the seed and the introduction of the reactant or reactants is carried out so that a substantially complete heterogeneous nucleation takes place over the grains of the fluidized bed. These grains can be grains of calcined and washed filtering sand.

The reactant comprises an alkaline solution and it must comprise one or preferably several of the following ions:
hydroxide ions;
fluoride ions;
calcium ions.

The reaction is very rapid and, in a few minutes, an extremely high degree of removal of the phosphate is obtained and an insoluble crystalline compound is formed between the calcium and the phosphate which is deposited on the sand grains.

However, no information is given in FR 2 426 042 A on the risk of blocking the discharge pipelines by the sand grains sheathed with crystalline phosphate and it is specified (page 9, lines 17-19) that the conditions for implementing the process can be chosen so as to virtually completely exclude the formation of calcium carbonate.

The present invention is concerned with a reactor of this same general type but in its application to the catalytic decarbonation of water comprising a calcium bicarbonate solution and it is targeted more particularly at eliminating or at least limiting the risks of blockage of the discharge pipes of this reactor by inert particles, such as sand, sheathed with calcium carbonate.

To this end, a subject matter of the invention is a device for the catalytic decarbonation of a water comprising calcium bicarbonate in solution, this device comprising a reactor comprising, in its lower part, an internal floor positioned transversely, means for feeding this reactor with pressurized water and with decarbonation reactant at the top surface of this floor, a bed of inert solid particles, such as sand, housed in the reactor above the floor, so that the pressurized water and the reactant pass through it from the bottom upward, at least one means for discharge of the treated water in the upper part of the reactor and discharge pipelines for the inert particles coated with calcium carbonate having a diameter at least equal to a predetermined dimension and entrained by water from the reactor, these pipelines emerging in the reactor, substantially at the level of the floor, via orifices flush with the floor or the internal face of the side walls and being connected to an external discharge pipe situated at a lower level than that of the floor, this device being characterized in that the discharge pipelines for the coated particles are rigid pipelines, the internal diameter of which is between 40 and 60 mm and preferably between 45 and 55 mm, and in that, for the purpose of ensuring regular discharge of the particles, without risk of blocking these pipelines, the latter exhibit a downward slope uninterrupted as far as the connection thereof with the external discharge pipe, with the exception, optionally, of a horizontal part starting from the orifice via which they emerge in the reactor.

A critical parameter of the discharge pipelines of the reactor is the internal diameter of these pipelines as, for inert particles coated with calcium carbonate having a hydraulic diameter at least equal to 1.2 mm, the rigid pipelines should preferably have a diameter of between 40 and 60 mm and more preferably still of between 45 and 55 mm.

This is because the trials carried out by the Applicant Company have shown that a smaller diameter of the pipelines is reflected by repeated blocking of the rigid removal piping, whereas a greater diameter results in sedimentation of the largest particles in the piping, due to an inadequate rate of flushing of these particles by the accompanying water stream, this rate having to be between 1.8 and 3 meters per second and preferably between 2 and 2.5 meters per second.

As indicated above, the discharge pipelines for the particles coated with calcium carbonate can have a horizontal upstream part but they must subsequently exhibit an uninterrupted slope as far as the external pipe to which these pipelines are connected and which constitutes a manifold. Additional flushing water can be supplied to this manifold in order to facilitate the transfer of the particles.

Preferably, these discharge pipelines emerge in the reactor via orifices flush with the floor, via which point the large particles are purged.

The curved parts of these pipelines preferably have a large radius of curvature equal at least to three times their diameter.

A rapid-coupling branch pipe can advantageously be provided on each pipeline in order to be able to unblock the latter under high pressure, in the event of untimely blockage, and even to wash countercurrentwise.

Optionally, an automatic system for controlling the discharge of the inert particles coated with calcium carbonate having a diameter at least equal to a predetermined value can be provided, this system being indexed over the real residence time of the treated water in the reactor.

It should be noted that the decarbonation reactant used can, according to requirements, be line $Ca(OH)_2$ or soda NaOH.

The use of these various characteristics makes it possible to optimize the purge of the largest particles coated with calcium carbonate while minimizing the accompanying volume of water removed from the reactor by a factor of approximately 20% and furthermore to remove more large particles with respect to the entire body of material discharged during each purge. This is because it is found that, with the device in accordance with the invention, from 70 to 85% of the particles removed are "large beads", whereas, according to the known art, this percentage does not exceed 35 to 45%.

PREFERRED EMBODIMENT OF THE INVENTION

A preferred embodiment of the invention will be described below, with reference to the appended diagrammatic drawings, in which.

Figure 1:
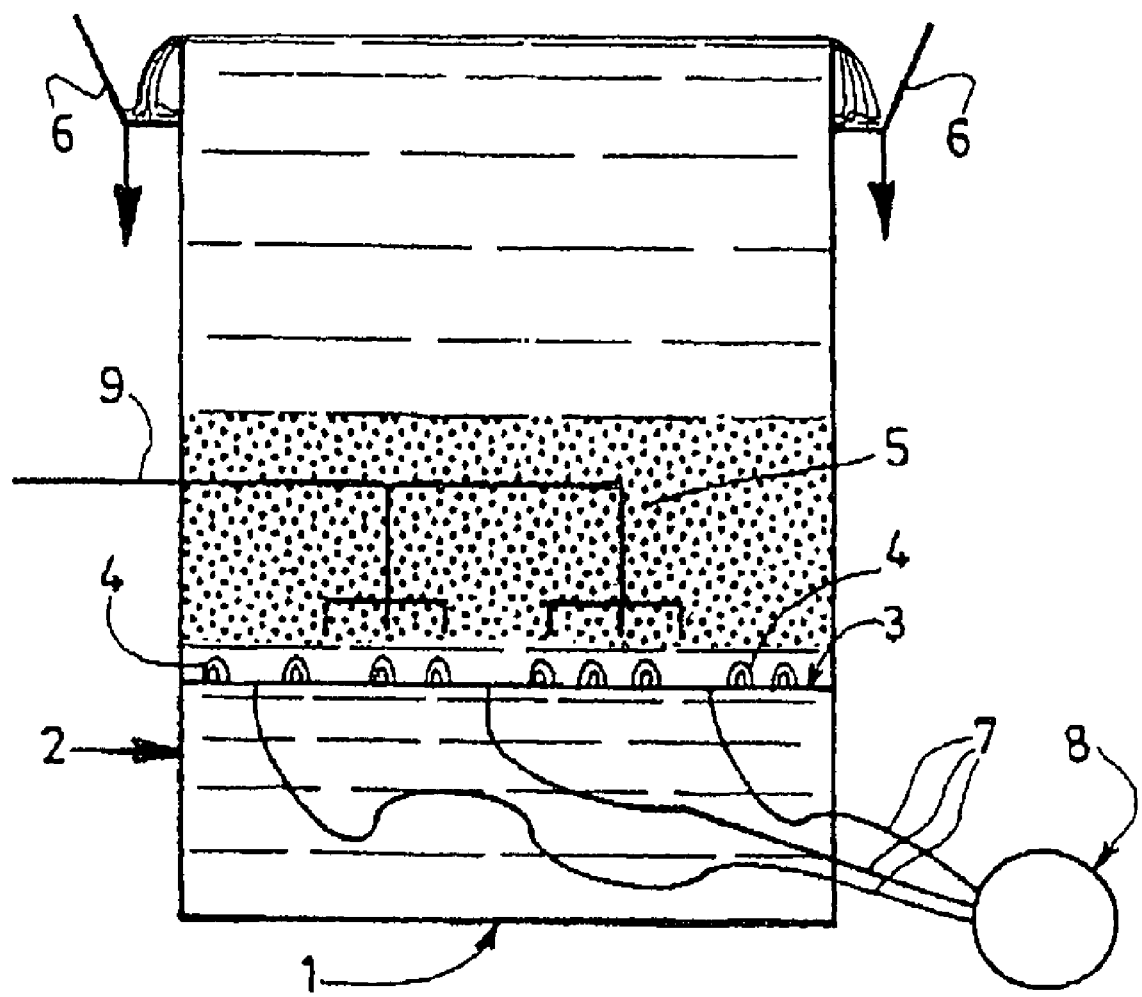
FIG. 1 is a diagrammatic vertical cross section of a device of the prior art.

Reference will be made first to FIG. 1, which represents a vertical cylindrical reactor 1 fed, in its lower part, via a line 2, with pressurized water to be treated comprising calcium bicarbonate in solution. The line 2 emerges in the reactor 1 below a floor 3 positioned horizontally and the water is spread under pressure into the reactor via nozzles 4 distributed uniformly at the top surface of the floor 3.

A line 9 makes it possible to introduce the decarbonation reactant (lime or soda) into the reactor.

The pressurized water to be treated passes, from the bottom upward, through a bed of sand 5 positioned above the floor 3, while the treated water is discharged in the upper part of the reactor by overflowing into one or more external troughs 6.

On contact with the decarbonation reactant, the calcium bicarbonate present in the water to be treated reacts and is converted to calcium carbonate $CaCO_3$, which is deposited on the sand grains, which constitute so many crystallization seeds, but this reaction occurs essentially in the lower part of the bed 5, where the water is richer in calcium bicarbonate and in decarbonation reactant.

The result of this is that the sand grains deposited at the base of the bed 5 have a tendency to form much larger particles coated with calcium carbonate than in the upper part of the bed and it is thus necessary to carry out periodic or continuous purges of those of these particles which reach or exceed a hydraulic diameter greater than or equal to a predetermined value, generally of the order of 1.2 mm.

For this purpose, according to the usual technique, flexible pipes 7 for discharge of these large particles are provided, which pipes emerge in the top surface of the floor via orifices flush with this surface and are connected to a manifold 8 situated at a lower level than that of the floor 1, in which the large particles are entrained by an accompanying stream of water originating from the reactor.

However, these flexible pipes 7 do not occupy fixed positions with respect to the floor and they thus have a tendency to be displaced or to be distorted during use. Furthermore, they do not have a slope continuously inclined downward, in the direction of the manifold 8, and the risks of blockage of these pipes 7 by the large particles removed from the reactor are therefore high. This risk is minimized with the reactor in accordance with the invention, represented in FIG. 2.

In this FIG. 2, the elements already described with reference to FIG. 1 or having similar functions are denoted by the same reference numbers modified with the sign.

In this embodiment in accordance with the invention, rigid pipelines 7'a, occupying fixed positions with respect to the floor 3' and continuously inclined downward according to an uninterrupted downward slope in the direction of the manifold 8, so as to eliminate or minimize the risks of blockage of these pipelines, have been substituted for the flexible discharge pipes 7 of the prior art.

Figure 2:
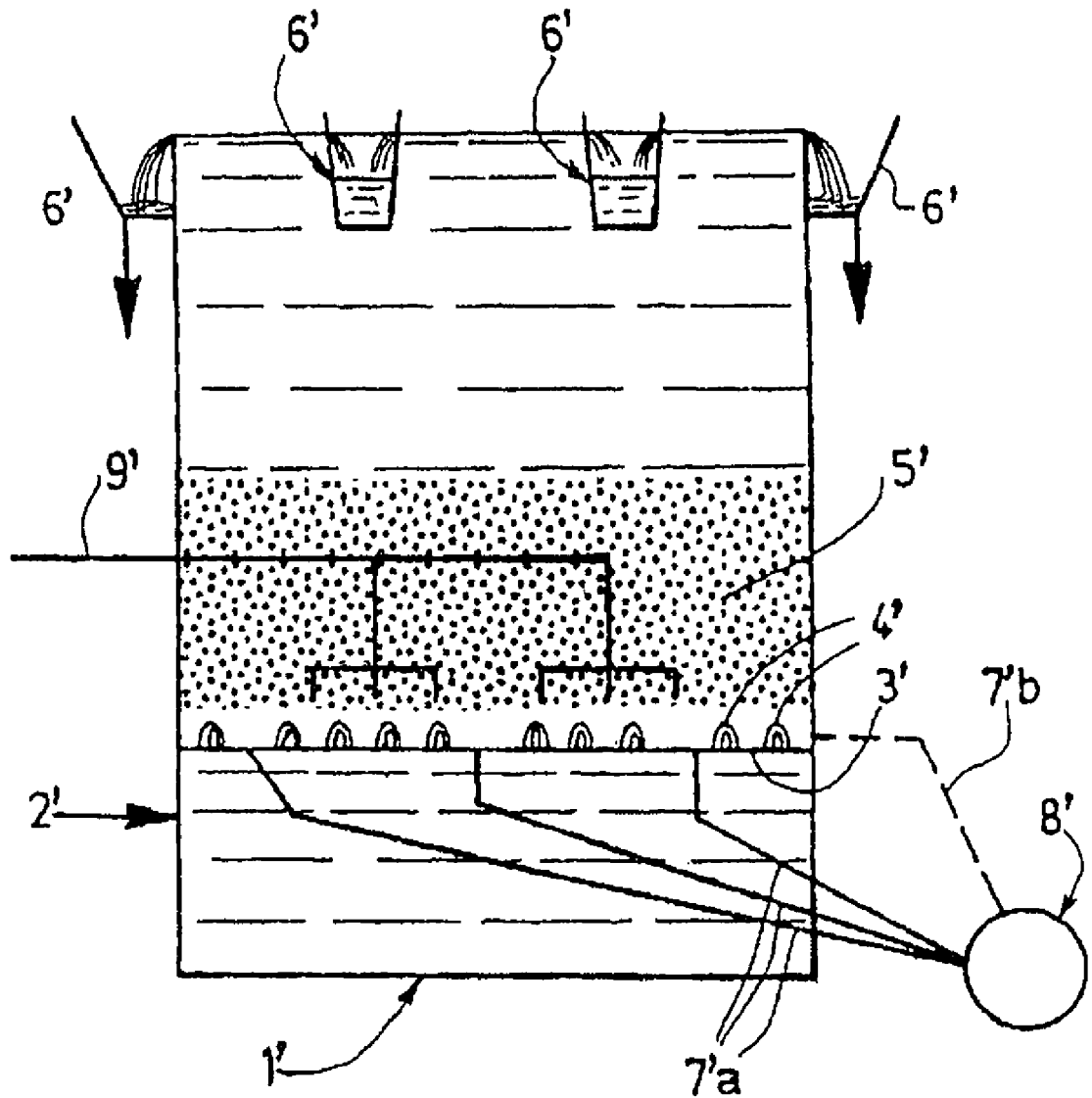
FIG. 2 is an analogous cross section of a device in accordance with the invention.

Without departing from the scope of the invention, the rigid discharge pipelines can also emerge in the reactor at the base of the side walls of the latter and can comprise a horizontal upstream part, the axis of which is substantially situated at the level of the face of the floor turned toward the inside of the reactor (case of the pipelines represented by dotted lines in 7'b in FIG. 2).

The pipelines have a specific diameter, for example 50 mm, and their bent parts preferably have a large radius of curvature at least equal to three times the diameter of the piping and of the order of 15 cm for a diameter of 50 mm.

Under these conditions, with an appropriate rate of flushing of the particles in these pipelines by the accompanying water removed from the reactor, rate of between 1.8 and 3 meters per second, preferably of between 2 and 2.5 m/s, the risks of blockage of the pipelines 7' are greatly reduced and, as indicated above, not only is the volume of accompanying water necessary minimized but it is possible to remove a much higher percentage of large sand grains coated with calcium carbonate than according to the prior art.

What is claimed is:

1. A device for the catalytic decarbonation of a water comprising calcium bicarbonate in solution, the device comprising:
   a reactor (1') comprising: a floor (3') in a lower part of the reactor, at least means for feeding the reactor with pressurized water (2', 4') and with a decarbonation reactant (9') at the top surface of the floor, a bed (5') of inert solid particles housed in the reactor (1') above the floor (3'), so that the pressurized water and the reactant pass through the reactor from the bottom upward to treat the pressurized water, at least one means for discharge (6') of the treated pressurized water in an upper part of the reactor (1') and discharge pipelines (7'a, 7'b) that discharge the inert solid particles having a diameter at least equal to a predetermined dimension and entrained by water from the reactor, the discharge pipelines (7'a, 7'b) emerging in the reactor, substantially at the level of the floor (3'), via orifices flush with the floor or an internal face of side walls of the reactor and being connected to an external discharge pipe (8') situated at a lower level than the level of the floor,
   wherein the inert solid particles become coated with calcium carbonate due to the treatment of the pressurized water,
   wherein the discharge pipelines discharge the calcium carbonate coated inert solid particles, the discharge pipelines being rigid pipelines (7'a, 7'b) having an internal diameter between 40 and 60 mm, and
   wherein, to ensure regular discharge of the particles, without risk of blockage, the discharge pipelines exhibit a downward slope uninterrupted as far as the connection thereof with an external discharge pipe (8'), with the exception, optionally, of a horizontal part starting from the respective orifices via which the discharge pipelines emerge in the reactor (1').

2. The device as claimed in claim 1, wherein the discharge pipelines (7'a, 7'b) have bent parts and the bent parts have a radius of curvature at least equal to three times the diameter of the discharge pipelines.

3. A method for the catalytic decarbonation of water comprising calcium bicarbonate in solution using the device as claimed in either of claims 1 and 2, comprising:
   feeding the pressurized water and the decarbonation reactant into the reactor to convert the calcium bicarbonate to calcium carbonate and to coat the inert solid particles with the calcium carbonate;
   discharging the decarbonated pressurized water from the upper part of the reactor (1'); and
   discharging, from the discharge pipelines of the reactor (1'), the inert particles coated with calcium carbonate having a hydraulic diameter at least equal to 1.2 mm.

4. The method according to claim 3, wherein a rate of discharging of the particles coated with calcium carbonate by the discharge pipelines (7'a, 7'b) is between 1.8 meters per second and 3 meters/s.

5. The method according to claim 3, wherein the decarbonation reactant comprises lime or soda.

6. The method according to claim 4, wherein the rate of discharging of the particles coated with calcium carbonate by the discharge pipelines (7'a, 7'b) is between 2 and 2.5 meters per second.

7. The device as claimed in claim 1, wherein the inert solid particles comprise sand.

8. The device as claimed in claim 1, wherein the internal diameter of the discharge pipelines is between 45 and 55 mm.

* * * * *